(12) United States Patent
Chlandová et al.

(10) Patent No.: US 12,071,580 B2
(45) Date of Patent: Aug. 27, 2024

(54) FIRE-PROOF MATERIAL

(71) Applicant: FIRST POINT A.S., Hodonin (CZ)

(72) Inventors: Gabriela Chlandová, Borohrádek (CZ); Petr Španiel, České Meziřiči (CZ)

(73) Assignee: First Point A.S., Hodonin (CZ)

( * ) Notice: Subject to any disclaimer, the term of this patent is extended or adjusted under 35 U.S.C. 154(b) by 0 days.

(21) Appl. No.: 17/627,667

(22) PCT Filed: Jun. 26, 2020

(86) PCT No.: PCT/CZ2020/000032
§ 371 (c)(1),
(2) Date: Jan. 15, 2022

(87) PCT Pub. No.: WO2021/023322
PCT Pub. Date: Feb. 11, 2021

(65) Prior Publication Data
US 2022/0356402 A1    Nov. 10, 2022

(30) Foreign Application Priority Data

Aug. 6, 2019  (CZ) ................. CZ2019-511

(51) Int. Cl.
| | | |
|---|---|---|
| *C09K 21/02* | (2006.01) | |
| *C04B 14/42* | (2006.01) | |
| *C04B 28/26* | (2006.01) | |
| *C04B 111/00* | (2006.01) | |
| *C04B 111/28* | (2006.01) | |

(52) U.S. Cl.
CPC ............. *C09K 21/02* (2013.01); *C04B 14/42* (2013.01); *C04B 28/26* (2013.01); *C04B 2111/00017* (2013.01); *C04B 2111/28* (2013.01)

(58) Field of Classification Search
None
See application file for complete search history.

(56) References Cited

U.S. PATENT DOCUMENTS

| | | | |
|---|---|---|---|
| 5,242,494 A | 9/1993 | Callaghan et al. | |
| 10,344,484 B2 | 7/2019 | Moennig et al. | |
| 2006/0272542 A1 | 12/2006 | Horner, Jr. et al. | |
| 2009/0140097 A1 | 6/2009 | Collier et al. | |
| 2013/0015389 A1 | 1/2013 | Torres-Aranda, Jr. | |
| 2022/0356402 A1* | 11/2022 | Chlandová ............. | C09K 21/02 |

FOREIGN PATENT DOCUMENTS

| | | |
|---|---|---|
| CA | 1064200 A | 10/1979 |
| CN | 101164881 B | 9/2010 |
| CN | 102964107 A | 3/2013 |
| CN | 103923295 A | 7/2014 |
| CN | 105153827 A | 12/2015 |
| CN | 103351679 B | 2/2016 |
| CN | 106630909 A | 5/2017 |
| CN | 106747220 A | 5/2017 |
| CN | 106810879 A | 6/2017 |
| CN | 107254103 A | 10/2017 |
| CN | 107352549 A | 11/2017 |
| CN | 107501766 A | 12/2017 |
| CN | 109437818 A | 3/2019 |
| CN | 109879643 A | 6/2019 |
| CZ | 19902151 A3 | 3/1992 |
| CZ | 310398 A3 | 6/1999 |
| CZ | 201537 A3 | 2/2016 |
| CZ | 29896 U1 | 10/2016 |
| CZ | 29941 U1 | 11/2016 |
| CZ | 30925 U1 | 8/2017 |
| CZ | 31095 U1 | 10/2017 |
| CZ | 31096 U1 | 10/2017 |
| CZ | 31184 U1 | 11/2017 |
| CZ | 31269 U1 | 12/2017 |
| CZ | 31398 U1 | 1/2018 |
| CZ | 31596 U1 | 3/2018 |
| CZ | 2017127 A3 | 5/2018 |
| DE | 4038132 C1 | 6/1992 |
| DE | 19738373 A1 | 3/1999 |
| DE | 102005040091 A1 | 3/2007 |
| DE | 102012220176 A1 | 6/2013 |
| DE | 102014002594 A1 | 8/2015 |
| DE | 202015103555 U1 | 8/2015 |
| EP | 0004846 A1 | 10/1979 |
| EP | 0396076 A1 | 11/1990 |
| EP | 0620246 A1 | 10/1994 |
| EP | 1431354 A1 | 6/2004 |
| FR | 2048393 | 3/1971 |

(Continued)

OTHER PUBLICATIONS

U.S. Appl. No. 17/624,835, filed Jan. 4, 2022, Ms. Gabriela Chlandová.
U.S. Appl. No. 17/624,838, filed Jan. 4, 2022, Ms. Gabriela Chlandová.
U.S. Appl. No. 17/625,089, filed Jan. 5, 2022, Ms. Gabriela Chlandová.
U.S. Appl. No. 17/627,654, filed Jan. 15, 2022, Ms. Gabriela Chlandová.
U.S. Appl. No. 17/627,665, filed Jan. 15, 2022, Ms. Gabriela Chlandová.

(Continued)

*Primary Examiner* — Joseph D Anthony
(74) *Attorney, Agent, or Firm* — Austin LLP

(57) ABSTRACT

A fire-proof material, in particular a fire-proof thermal insulation material containing water glass, which is composed of a compound which contains 34 to 49.9 wt % of inorganic non-flammable fibres, 50 to 65 wt % of an aqueous silicate solution, and 0.1 to 1 wt % of water glass stabiliser, while it further contains a water glass hardener and the aqueous silicate solution has a density in the range of 1370 to 1400 kg/m$^3$ and a molar ratio of SiO$_2$ to Na$_2$O in the range of 3.2 to 3.4.

6 Claims, No Drawings

(56) References Cited

FOREIGN PATENT DOCUMENTS

| | | |
|---|---|---|
| FR | 2274580 A1 | 1/1976 |
| GB | 1260439 A | 1/1972 |
| JP | H11139819 A | 5/1999 |
| KR | 100997914 B1 | 12/2010 |
| KR | 101644957 B1 | 8/2016 |
| RU | 2010117476 A | 11/2011 |
| RU | 2545287 C1 | 3/2015 |
| RU | 2652683 C1 | 4/2018 |
| RU | 2687816 C1 | 5/2019 |
| SU | 1432028 A1 | 10/1988 |
| WO | 2007023091 A1 | 3/2007 |
| WO | 2008145599 A1 | 12/2008 |
| WO | 2012019988 A1 | 2/2012 |
| WO | 2014042987 A3 | 12/2014 |
| WO | 2018130699 A1 | 7/2018 |
| WO | 2018210605 A1 | 11/2018 |

OTHER PUBLICATIONS

U.S. Appl. No. 17/627,667, filed Jan. 15, 2022, Ms. Gabriela Chlandová.
U.S. Appl. No. 17/627,669, filed Jan. 15, 2022, Ms. Gabriela Chlandová.
Abstract for SU1432028 listed in Database WPI, Week 198927, Derwent World Patents Index, vol. 1989, No. 27, Database accession No. 1989-199122, XP002799847.
International Search Report for PCT/CZ2020/000018.
International Search Report for PCT/CZ2020/000019.
International Search Report for PCT/CZ2020/000021.
International Search Report for PCT/CZ2020/000023.
International Search Report for PCT/CZ2020/000031.
International Search Report for PCT/CZ2020/000032.
International Search Report for PCT/CZ2020/000033.
Search Report for Priority Application PV 2019-445.
Search Report for Priority Application PV 2019-446.
Search Report for Priority Application PV 2019-448.
Search Report for Priority Application PV 2019-507.
Search Report for Priority Application PV 2019-509.
Search Report for Priority Application PV 2019-511.
Search Report for Priority Application PV 2019-515.
Written Opinion for PCT/CZ2020/000018.
Written Opinion for PCT/CZ2020/000019.
Written Opinion for PCT/CZ2020/000021.
Written Opinion for PCT/CZ2020/000023.
Written Opinion for PCT/CZ2020/000031.
Written Opinion for PCT/CZ2020/000032.
Written Opinion for PCT/CZ2020/000033.

\* cited by examiner

FIRE-PROOF MATERIAL

CROSS-REFERENCE TO RELATED APPLICATIONS

This application is a U.S. National Stage under 35 U.S.C. § 371 of International Application No. PCT/CZ2020/000032, as filed on Jun. 26, 2020, which claims priority to the Czech Republic patent application No. PV 2019-511 filed on Aug. 6, 2019 and entitled "Fire-Proof Material." The disclosure of each of these applications is incorporated by reference herein for all purposes.

STATE OF THE ART

From current technology a large number of cladding materials in the form of panels are known.

Pressed mineral wool products treated with a fire-proof coating are commonly used. They show high values of thermal insulation, noise and fire-proofing properties, but they are usually very bulky and their installation is often rather difficult.

Furthermore, a wide range of fire-proof panels are known which, as a filler contain expanded vermiculite or perlite in the form of balls and an inorganic binder. They have good thermal insulation properties, but are not sufficiently strong.

Cement fibre panels are also known, which use Portland cement or a compound of cement and lime as a binder, to which hydrating additives are added, the filler being wood chips or mineral wool. The disadvantage is their great weight and the fact that they cannot be used as a filler in structures or equipment.

Further, magnesium oxide panels are also known. In addition to magnesium salts, they contain glass fibres and wood chips as filler. Their disadvantage is their high brittleness and higher weight, as well as their low ability to reflect heat and fire.

From patent document KR101644957 a cement fibre panel is known which contains glass or basalt fibres, the binder is cement and a phenolic resin. The disadvantage is that the panels are not fire-proof, water resistant nor sufficiently flexible.

From a further patent document KR101791409 is known a fibrous panel in which the binder is an organic polymer. The disadvantage of this panel is that it is flammable.

From patent document CZ PV 2015-37 is known a refractory geopolymer composite which consists of a solid component and a liquid component of a geopolymer binder forming a matrix and further comprises reinforcing structures having the function of a filler. The solid component of the geopolymer binder consists of raw materials containing metakaolin and/or ground blast furnace granulated slag in the amount of 35 to 60 wt %, the liquid component of the geopolymer binder consists of an aqueous solution of sodium silicate in the amount of 35 to 45 wt %. The solid component acting as a filler consists of basalt fibre material and/or recycled carbon fibre material and/or chopped glass fibres in the amount of 1 to 20 wt %, with the last component of the refractory geopolymer composite being pure aluminium powder or aluminium paste in the quantity of 1 to 2 wt %. The raw material containing metakaolin and/or ground blast furnace granulated slag can be mixed with fly ash in a maximum possible ratio of 2:1. The disadvantage of this composite is the complex production and the limited thermal resistance. Therefore, it cannot be used as a material with fire-proof properties.

The fire-proof materials used today primarily meet the condition of non-flammability. They use standard materials: lime, cement, and traditional fillers, i.e. mineral fibres, wood, and paper. Most of these have a great weight and these mixtures are not suitable as a filler for construction or industrial equipment. Often they often do not have a sufficiently low coefficient of thermal conductivity, which can be increased by absorbency and consequently the presence of moisture in the material. Another weakness is their low material strength or flexibility. Although they are non-flammable materials, they often cannot directly reflect a burning flame and heat.

From the aforementioned current technology it is clear that main disadvantage of current technology is that the known materials have limited fire resistance.

The object of the invention is the construction of a material which will have high fire resistance, while at the same time being environmentally friendly and easy to use for various kinds of applications.

PRINCIPLE OF THE INVENTION

The above-mentioned disadvantages are largely eliminated and the objects of the invention are fulfilled by a fire-proof material, in particular a fire-proof thermal insulation material comprising water glass which, according to the invention, is characterised by that it is composed of a compound which contains 34 to 49.9 wt % of inorganic non-flammable fibres, 50 to 65 wt % of an aqueous silicate solution, and 0.1 to 1 wt % of water glass stabiliser, while it further contains a water glass hardener and the aqueous silicate solution has a density in the range of 1370 to 1400 $kg/m^3$ and a molar ratio of $SiO_2$ to $Na_2O$ in the range of 3.2 to 3.4. The advantage of this fire-proof material is its high thermal stability, high fire resistance, and also that it is environmentally friendly and harmless to health. It is further to advantage that the fire-proof material contains a water glass hardener, which may be glycerol mono to triacetate or a compound thereof. The advantage is that it is possible to optimise the hardening speed. It is also an advantage that the resulting material is partially flexible after solidification.

According to the first variant, it is advantageous if the inorganic non-flammable fibres are glass fibres. To advantage, the glass fibres are alkali zirconium silicate fibres. These fibres are flexible, strong, pliable, have low thermal conductivity, are heat resistant, are chemically resistant, are resistant to alkalis, acids and organic solvents, and have a high coefficient of sound absorption. They are non-flammable. They are ecological and harmless to health.

According to the second variant, it is advantageous if the inorganic non-flammable fibres are basalt fibres. These fibres are very flexible, highly strong and pliable, have low thermal conductivity, high thermal resistance, are chemically resistant to water, alkalis, acids and organic solvents, and have a high coefficient of sound absorption. They are non-flammable. They are ecological and harmless to health.

It is to advantage that the inorganic non-combustible fibres have a length of 6 to 12 mm.

In the most advantageous variant, the aqueous silicate solution is an aqueous sodium silicate solution.

It is to further advantage that the water glass stabilisers are hydrophilic alkoxy alkyl-ammonium salts.

The main advantage of the fire-proof material according to the invention is that it is highly non-flammable, has a high heat resistance of over 1000° C. and is refractory. After hardening, it has the form of glass, so it is sufficiently hard, strong and water-resistant, while at the same time being vapour-permeable. Concurrently, it is resistant to impact and pressure. The fire-proof material can be easily used for various types of applications, it can be freely shaped, it is light and dimensionally stable. It can also be used in safes and other security systems, such as security doors. Another advantage is that it is also possible to produce solid products from it, such as insulation panels and fittings and, the fire-proof material can be applied in its liquid state as well.

EXAMPLES OF THE PERFORMANCE OF THE INVENTION

Example 1

The fire-proof insulation material is composed of a compound which contains 41 wt % of inorganic non-combustible fibres, 58.5 wt % of aqueous sodium silicate solution, and 0.5 wt % water glass stabiliser.

The inorganic non-combustible fibres are alkali zirconium silicate glass fibres, which have a length of 6 to 12 mm.

The fire-proof material further contains a water glass hardener, which is a compound of pure glycerol diacetate/triacetate in a ratio of 7:3 parts by volume, with a concentration of 0.5 to 5 wt % to pure water glass.

The water glass stabilisers are hydrophilic alkoxy alkyl-ammonium salts, in the form of a 98% aqueous solution of N,N,N',N'-Tetrakis (2-hydroxypropyl) ethylenediamine.

The aqueous sodium silicate solution has a density of 1390 kg/m$^3$ and the molar ratio of SiO$_2$ to Na$_2$O is 3.3.

The resulting compound is poured into a silicone mould in the form of a panel and left undisturbed to harden, with the product being a fire-proof insulation panel.

Example 2

The fire-proof insulation material is composed of a compound which contains 41 wt % of inorganic non-combustible fibres, 58.5 wt % of aqueous sodium silicate solution, and 0.5 wt % water glass stabiliser.

The inorganic non-flammable fibres are basalt fibres which have a length of 6 to 12 mm.

The fire-proof material further contains a water glass hardener, which is a compound of pure glycerol diacetate/triacetate in a ratio of 7:3 parts by volume, with a concentration of 0.5 to 5 wt % to pure water glass.

The water glass stabilisers are hydrophilic alkoxy alkyl-ammonium salts, in the form of a 98% aqueous solution of N,N,N',N'-Tetrakis (2-hydroxypropyl) ethylenediamine.

The aqueous sodium silicate solution has a density of 1370 kg/m$^3$ and the molar ratio of SiO$_2$ to Na$_2$O is 3.2.

The resulting compound is poured into the cavity of a vault door and is left undisturbed to harden, with the product being a fire-proof vault door.

Example 3

The fire-proof insulation material is composed of a compound which contains 34 wt % of inorganic non-combustible fibres, 65 wt % of aqueous sodium silicate solution, and 1 wt % water glass stabiliser.

The inorganic non-flammable fibres are alkali zirconium silicate glass fibres, which have a length of 6 to 12 mm.

The fire-proof material further contains a water glass hardener, which is a compound of pure glycerol diacetate/triacetate in a ratio of 7:3 parts by volume, with a concentration of 0.5 to 5 wt % to pure water glass.

The water glass stabilisers are hydrophilic alkoxy alkyl-ammonium salts, in the form of a 98% aqueous solution of N,N,N',N'-Tetrakis (2-hydroxypropyl) ethylenediamine.

The aqueous sodium silicate solution has a density of 1,400 kg/m$^3$ and the molar ratio of SiO$_2$ to Na$_2$O is 3.4.

The resulting compound is poured into a silicone mould in the form of a panel and left undisturbed to harden, with the product being a fire-proof insulation panel.

Example 4

The fire-proof insulation material is composed of a compound which contains 34 wt % of inorganic non-combustible fibres, 65 wt % of aqueous sodium silicate solution, and 1 wt % water glass stabiliser.

The inorganic non-flammable fibres are basalt fibres, which have a length of 6 to 12 mm.

The fire-proof material further contains a water glass hardener, which is a compound of pure glycerol diacetate/triacetate in a ratio of 7:3 parts by volume, with a concentration of 0.5 to 5 wt % to pure water glass.

The water glass stabilisers are hydrophilic alkoxy alkyl-ammonium salts, in the form of a 98% aqueous solution of N,N,N',N'-Tetrakis (2-hydroxypropyl) ethylenediamine.

The aqueous sodium silicate solution has a density of 1390 kg/m$^3$ and the molar ratio of SiO$_2$ to Na$_2$O is 3.3.

The resulting compound is poured into the cavity of a vault covering wall and is left undisturbed to harden, with the product being a vault cage.

Example 5

The fire-proof insulation material is composed of a compound which contains 49.9 wt % of inorganic non-combustible fibres, 50 wt % of aqueous sodium silicate solution, and 0.1 wt % water glass stabiliser.

The inorganic non-combustible fibres are alkali zirconium silicate glass fibres, which have a length of 6 to 12 mm.

The fire-proof material further contains a water glass hardener, which is a compound of pure glycerol diacetate/triacetate in a ratio of 7:3 parts by volume, with a concentration of 0.5 to 5 wt % to pure water glass.

The water glass stabilisers are hydrophilic alkoxy alkyl-ammonium salts, in the form of a 98% aqueous solution of N,N,N',N'-Tetrakis (2-hydroxypropyl) ethylenediamine.

The aqueous sodium silicate solution has a density of 1390 kg/m$^3$ and the molar ratio of SiO$_2$ to Na$_2$O is 3.3.

The resulting compound is poured into a silicone mould in the form of a panel and left undisturbed to harden, with the product being a fire-proof insulation panel.

INDUSTRIAL APPLICATION

The fire-proof material according to the invention has a wide range of uses in the construction and industrial sectors, while it can not only be used to make separate insulation products, but can also be used to fill various spaces with complex shapes. It is advantageous, for example, to use it for the insulation of walls from heat sources, the insulation of ceilings under soffits, insulation layers for baking surfaces and ovens, the insulation of fireplaces and stoves, for heat shielding, as a fire-proof insert for doors, gates, resistant sealing around cables, pipes and cable trays, refractory protection of load-bearing structures. They can also be used as chemical protection, for example for the production of chemical-resistant mats. It is also advantageous for use in security systems, such as vault wall fillings.

The invention claimed is:

1. A fire-proof thermal insulation material comprising 34 to 49.9 wt % of inorganic non-flammable fibers, 50 to 65 wt % of an aqueous silicate solution, and 0.1 to 1 wt % of a water glass stabilizer, further comprising a water glass hardener, wherein the aqueous silicate solution has a density in the range of 1370 to 1400 kg/m$^3$ and a molar ratio of $SiO_2$ to $Na_2O$ in the range of 3.2 to 3.4.

2. The fire-proof material according to claim 1, wherein the inorganic non-flammable fibers are glass fibers.

3. The fire-proof material according to claim 1, wherein the inorganic non-flammable fibers are basalt fibers.

4. The fire-proof material according to claim 1, wherein the inorganic non-flammable fibers have a length of 6 to 12 mm.

5. The fire-proof material according to claim 1, wherein the aqueous silicate solution is an aqueous sodium silicate solution.

6. The fire-proof material according to claim 1, wherein the water glass stabilizers are hydrophilic alkoxy alkyl-ammonium salts.

* * * * *